US012749700B2

(12) United States Patent
Na et al.

(10) Patent No.: US 12,749,700 B2
(45) Date of Patent: Sep. 29, 2026

(54) RECHARGEABLE BATTERY WITH HYBRID CATHODE COMPRISING CONVERSION AND INTERCALATION ACTIVE MATERIALS

(71) Applicants: International Business Machines Corporation, Armonk, NY (US); Central Glass Co., LTD., Tokyo (JP)

(72) Inventors: Young-Hye Na, San Jose, CA (US); Maxwell Giammona, Fremont, CA (US); Tsubasa Itakura, Miyoshi Town (JP); Saori Itabashi, Kawagoe City (JP); Rei Tsukazaki, Fujisawa City (JP); Katsutoshi Suzuki, Hino City (JP); Kazunari Takeda, Tsurugashima City (JP)

(73) Assignee: International Business Machines Corporation, Armonk, NY (US)

(*) Notice: Subject to any disclaimer, the term of this patent is extended or adjusted under 35 U.S.C. 154(b) by 731 days.

(21) Appl. No.: 17/853,981

(22) Filed: Jun. 30, 2022

(65) Prior Publication Data

US 2024/0006653 A1 Jan. 4, 2024

(51) Int. Cl.

*H01M 10/0525* (2010.01)
*H01M 4/02* (2006.01)

(Continued)

(52) U.S. Cl.

CPC ..... *H01M 10/0525* (2013.01); *H01M 4/0404* (2013.01); *H01M 4/1397* (2013.01); *H01M 4/582* (2013.01); *H01M 4/80* (2013.01); *H01M 4/806* (2013.01); *H01M 10/0567* (2013.01); *H01M 10/0568* (2013.01);

(Continued)

(58) Field of Classification Search

None

See application file for complete search history.

(56) References Cited

U.S. PATENT DOCUMENTS 10,587,009 B2 3/2020 Chiang
10,727,486 B2 7/2020 Johnson (Continued)

FOREIGN PATENT DOCUMENTS

CN 103996891 A 8/2014
CN 104600319 A 5/2015

(Continued)

OTHER PUBLICATIONS

Eo et al. ("Effect of an inorganic additive on the cycling performances of lithium-ion polymer cells assembled with polymer-coated separators," Journal of Power Sources 189(1), pp. 766-770, Apr. 2009) (Year: 2009).*

(Continued)

*Primary Examiner* — Niki Bakhtiari
*Assistant Examiner* — James A Corno
(74) *Attorney, Agent, or Firm* — Aaron N. Pontikos

(57) ABSTRACT

A rechargeable battery is disclosed. The rechargeable battery includes an anode, a cathode including a lithium-ion intercalation host, and an electrolyte including a solvent and a halogen-containing compounding that functions as an active cathode conversion material, wherein the electrolyte is in contact with the anode and the cathode.

22 Claims, 6 Drawing Sheets

(51) Int. Cl.

| | |
|---|---|
| ***H01M 4/04*** | (2006.01) |
| ***H01M 4/1397*** | (2010.01) |
| ***H01M 4/58*** | (2010.01) |
| ***H01M 4/80*** | (2006.01) |
| ***H01M 10/0567*** | (2010.01) |
| ***H01M 10/0568*** | (2010.01) |
| ***H01M 10/0569*** | (2010.01) |
| ***H01M 10/0585*** | (2010.01) |

(52) U.S. Cl.
CPC ... *H01M 10/0569* (2013.01); *H01M 10/0585* (2013.01); *H01M 2004/028* (2013.01); *H01M 2300/0028* (2013.01)

(56) References Cited

U.S. PATENT DOCUMENTS

| | | | | |
|---|---|---|---|---|
| 10,847,841 | B2 | 11/2020 | Park | |
| 11,205,796 | B2 | 12/2021 | Sella | |
| 2015/0118582 | A1 | 4/2015 | Badding | |
| 2019/0006701 | A1 | 1/2019 | Dai | |
| 2019/0221887 | A1 | 7/2019 | Kim | |
| 2021/0036323 | A1* | 2/2021 | Kim | H01M 4/625 |
| 2021/0135290 | A1 | 5/2021 | Lee | |
| 2021/0273215 | A1 | 9/2021 | Shao-Horn | |
| 2021/0336293 | A1 | 10/2021 | Ji | |
| 2021/0336295 | A1 | 10/2021 | Giammona | |
| 2021/0399331 | A1 | 12/2021 | Sakamoto | |
| 2022/0013778 | A1 | 1/2022 | Kim | |
| 2022/0021028 | A1 | 1/2022 | Cao | |

FOREIGN PATENT DOCUMENTS

| | | | |
|---|---|---|---|
| CN | 119366025 | A | 1/2025 |
| DE | 112023002154 | T5 | 6/2025 |
| JP | 2025-520708 | A | 7/2025 |
| WO | 2021019320 | A1 | 2/2021 |
| WO | 2024/002141 | A1 | 1/2024 |

OTHER PUBLICATIONS

Ishikawa et al. ("In Situ Scanning Vibrating Electrode Technique for the Characterization of Interface Between Lithium Electrode and Electrolytes Containing Additives," Journal of the Electrochemical Society 141(12), L159-L161, 1994) (Year: 1994).*
Choudhury ("Lithium Fluoride Additives for Stable Cycling of Lithium Batteries at High Current Densities," in Rational Design of Nanostructured Polymer Electrolytes and SolidâLiquid Interphases for Lithium Batteries, Springer Theses, doi: 10. 1007/978-3-030-28943-0_5, Sep. 2019) (Year: 2019).*
Sun et al. ("In Situ Chemical Synthesis of Lithium Fluoride/Metal Nanocomposite for High Capacity Prelithiation of Cathodes," Nano Letters 16(2), pp. 1497-1501, Jan. 2016) (Year: 2016).*
Cabana et al., "Beyond Intercalation-Based Li-Ion Batteries: The State of the Art and Challenges of Electrode Materials Reacting Through Conversion Reactions", Advanced Energy Materials, 2010, 22, E170-E192, DOI: 10.1002/adma.201000717.
Etacheri et al., "Challenges in the development of advanced Li-ion batteries: a review", Energy & Environmental Science, DOI: 10.1039/c1ee01598b, Accepted Jun. 10, 2011, 20 pages.
Hao et al., "Designing A Hybrid Electrode Toward High Energy Density With A Staged Li+ And PF6-Deintercalation/Intercalation Mechanism", approved Jan. 3, 2020 (received for review Oct. 22, 2019), PNAS, Feb. 11, 2020, vol. 117, No. 6, pp. 2815-2823.
Heller, Adam, "Potentially implantable miniature batteries", Anal Bioanal Chem 385, 469-473 (2006), <https://doi.org/10.1007/s00216-006-0326-4>, Abstract Only.
Karden et al., "Energy storage devices for future hybrid electric vehicles", Science Direct, Journal of Power Sources, vol. 168, Issue 1, May 25, 2007, pp. 2-11, Abstract Only.
Lee et al., "Advances In The Cathode Materials For Lithium Rechargeable Batteries", Angew. Chem. Int. Ed. 2020, 59, pp. 2578-2605.
Nitta et al., "Li-ion battery materials: present and future", Materials Today, vol. 18, No. 5, Jun. 2015, Elsevier, 13 pages.
Riegger et al., "Lithium-Metal Anode Instability Of The Superionic Halide Solid Electrolytes And The Implications For Solid-State Batteries", Wiley Online Library, Angew. Chem. 2021, 133, pp. 6792-6797.
Tarascon et al., "Issues and challenges facing rechargeable lithium batteries", Nature, vol. 414, Nov. 15, 2001, 9 pages.
Xu, Kang, "Nonaqueous Liquid Electrolytes for Lithium-Based Rechargeable Batteries", Chemical Reviews, 2004, vol. 104, No. 10, pp. 4303-4417, Received Nov. 3, 2003.
Yang et al., "Aqueous Li-ion battery enabled by halogen conversion-intercalation chemistry in graphite", <https://doi.org/10.1038/s41586-019-1175-6>, May 9, 2019, vol. 569, Nature, 19 pages.
Zhang et al., "Advanced High-Voltage All-Solid-State Li-Ion Batteries Enabled By A Dual-Halogen Solid Electrolyte", Adv. Energy Mater, 2021, 2100836, 10 pages, DOI: 10.1002/aenm.202100836.
International Application No. PCT/CN2023/103103 filed Jun. 28, 203.
International Search Report and Written Opinion dated Oct. 7, 2023 from International Application No. PCT/CN2023/103103 filed Jun. 28, 203.

* cited by examiner

RECHARGEABLE BATTERY WITH HYBRID CATHODE COMPRISING CONVERSION AND INTERCALATION ACTIVE MATERIALS

BACKGROUND OF THE INVENTION

The present invention relates generally to the field of energy storage devices, and more particularly, to energy storage devices having cathode(s) formed from multiple active materials, including at least one active material that utilizes a chemical conversion mechanism of energy storage, and at least one other active material that utilizes an ion-intercalation mechanism of energy storage.

Secondary energy storage devices, or simply rechargeable batteries, are energy storage devices that can be electrically recharged after use to their original pre-discharge condition by passing current through the circuit in the opposite direction to the current during discharge. Energy storage devices, such as lithium-ion batteries, may have high energy density, and provide a compact, rechargeable energy source suitable for use in portable electronics, electric transportation, and renewable energy storage. Rechargeable batteries that use metallic lithium as an anode active material allow for higher energy density than the current state of the art lithium-ion batteries which utilize graphite for this purpose.

Rechargeable batteries are high in demand for a wide range of applications, from small batteries for industrial and medical devices, to larger batteries for electric vehicles (EVs) and grid energy storage systems. Each application requires a specific set of electrochemical performance characteristics and in many critical and growing application species today, such as EVs, the batteries performance is still considered a major limiting factor for satisfying the high standard of performance to meet customers' needs.

Currently, the two types of rechargeable batteries that are typically discussed in both industry and academia are batteries that run via electrochemical intercalation/de-intercalation of acting ions, and batteries that run via conversion of active electrode/electrolyte materials. The most widely used rechargeable batteries (aside from the lead-acid batteries used in internal combustion vehicles) are lithium-ion batteries (LIBs). Generally, most commercial LIBs today use a metal oxide or metal phosphate based lithium intercalation material as the positive electrode, a carbon-graphite based intercalation material as the negative electrode, and move lithium ions back and forth between them through a liquid electrolyte as the battery is charged and discharged.

Despite the rapid growth and success of LIBs, there remain several shortcomings to be overcome to meet the rapidly increasing market demand for higher performance batteries. The relatively low energy density and high cost of cathode materials, such as cobalt and nickel, have been one of the largest issues that have prevented lithium-ion batteries from moving forward to a wider range of applications. However, as lithium-ion batteries approach and in some cases even exceed the 300 watt hour per kilogram (Wh/kg) specific energy mark, it is widely understood that we are reaching the limit of how far science and engineering can push the specific energy and energy density of lithium-ion batteries.

SUMMARY

What is needed, as recognized by the present invention, is lithium-ion batteries having higher energy density cathodes formed from cheaper cathode materials. Embodiments of the present invention provide for methods and resulting hybrid energy storage devices thereof that increase the energy density and/or reduces the cost of rechargeable lithium-ion battery cathodes by hybridizing a traditional lithium-ion intercalation cathode material with a halogen or metal-halide conversion cathode material to form an improved cathode.

The shortcomings of current lithium-ion batteries, and additional advantages are provided, through a dissolved phase hybrid cathode lithium-ion battery (also referred to herein as a first rechargeable battery) in accordance with at least one embodiment of the present invention. The dissolved phase hybrid cathode lithium-ion battery includes an anode, a cathode including a lithium-ion intercalation host, and an electrolyte including a solvent and a first halogen-containing compound that functions as an active cathode conversion material, where the electrolyte is in contact with the anode and the cathode.

In an embodiment, the cathode further includes a second halogen-containing compound functioning as an active cathode conversion material.

In an embodiment, the first halogen-containing compound functioning as the active cathode conversion material included in the electrolyte and the second halogen-containing compound functioning as the active cathode conversion material included in the cathode are the same.

In an embodiment, the first halogen-containing compound functioning as the active cathode conversion material included in the electrolyte and the second halogen-containing compound functioning as the active cathode conversion material included in the cathode are different.

In an embodiment, the halogen-containing compound functioning as the active cathode conversion material included in the electrolyte is a metal halide.

In an embodiment, the metal halide dissociates into a respective halide ion and a respective metal ion in the solvent, and wherein the halide ion includes at least one of $I^-$, $Br^-$, $Cl^-$, or $F^-$, and the metal ion includes at least one of $Li^+$, $Al^{3+}$, $Mg^{2+}$, or $Na^+$.

In an embodiment, the lithium-ion intercalation host is selected from the group consisting of lithium cobalt oxide, nickel cobalt aluminum, lithium ion manganese oxide, lithium nickel manganese cobalt oxide, nickel cobalt manganese oxide, lithium iron phosphate and mixtures and combinations thereof.

In an embodiment, the solvent of the electrolyte is selected from the group consisting of carbonate compounds, heterocyclic compounds, ethers, esters, cyclic ethers, cyclic esters, nitriles, ethereal nitriles, and mixtures and combinations thereof.

In an embodiment, the dissolved phase hybrid cathode lithium-ion battery further includes one or more oxidizing gases selected from the group consisting of air, oxygen, nitric oxide, nitrogen dioxide, and mixtures and combinations thereof.

The shortcomings of current lithium-ion batteries, and additional advantages are provided, through a solid phase hybrid cathode lithium-ion battery (also referred to herein as a second rechargeable battery) in accordance with at least one embodiment of the present invention. A solid phase hybrid cathode lithium-ion battery is disclosed. The solid phase hybrid cathode lithium-ion battery includes an anode, a cathode including a lithium-ion intercalation host and a halogen-containing compound that functions as an active cathode conversion material, and an electrolyte including a solvent and a lithium containing compound, where the electrolyte is in contact with the anode and the cathode.

In an embodiment, the halogen-containing compound functioning as the active cathode conversion material included in the cathode of the solid phase hybrid cathode lithium-ion battery is a halogen or a metal halide.

the metal halide includes a respective halide ion and a respective metal ion, and wherein the halide ion includes at least one of $I^-$, $Br^-$, $Cl^-$, or $F^-$, and the metal ion includes at least one of $Li^+$, $Al^{3+}$, $Mg^{2+}$, or $Na^+$.

In an embodiment, the lithium containing compound included in the electrolyte is a lithium salt.

In an embodiment, the lithium-ion intercalation host is selected from the group consisting of lithium cobalt oxide, nickel cobalt aluminum, lithium ion manganese oxide, lithium nickel manganese cobalt oxide, nickel cobalt manganese oxide, lithium iron phosphate and mixtures and combinations thereof.

In an embodiment, the solvent of the electrolyte is selected from the group consisting of carbonate compounds, heterocyclic compounds, ethers, esters, cyclic ethers, cyclic esters, nitriles, ethereal nitriles, and mixtures and combinations thereof.

In an embodiment, the solid phase hybrid cathode lithium-ion battery further includes one or more oxidizing gases selected from the group consisting of air, oxygen, nitric oxide, nitrogen dioxide, and mixtures and combinations thereof.

The shortcomings of current lithium-ion batteries, and additional advantages are provided, through a method of forming a dissolved phase hybrid cathode lithium-ion battery (i.e., the first rechargeable battery) in accordance with at least one embodiment of the present invention. The method includes coating a slurry including a lithium containing intercalation material onto a cathode current collector. The method further includes dissolving a cathode conversion material that includes at least one of a metal halide or a halogen into a solvent to form a solution. The method further includes stacking an anode, a separator, and the cathode current collector to form the dissolved phase hybrid cathode lithium-ion battery. The dissolved phase hybrid cathode lithium-ion battery includes the anode, an electrolyte including the solution, the separator, and the cathode current collector coated with the slurry, where the at least one of the metal halide or the halogen of the electrolyte functions as an active cathode conversion material.

In an embodiment, the method includes adding a second halogen or metal halide to the cathode, where the second halogen or metal halide also functions as an active cathode conversion material.

In an embodiment, the second halogen or metal halide added to the cathode is the same as the halogen or metal halide included in the electrolyte.

In an embodiment, the second halogen or metal halide added to the cathode is different than the halogen or metal halide included in the electrolyte.

In an embodiment, the method includes replacing a portion of the lithium-ion intercalation material with a second metal halide or halogen, where the second metal halide or halogen also functions as an active cathode conversion material.

In an embodiment, the second metal halide or halogen replacing the portion of the lithium-ion intercalation material is the same as the halogen or metal halide included in the electrolyte.

In an embodiment, the second metal halide or halogen replacing the portion of the lithium-ion intercalation material is different than the halogen or metal halide included in the electrolyte.

The shortcomings of current lithium-ion batteries, and additional advantages are provided, through a solid phase hybrid cathode lithium-ion battery in accordance with at least one embodiment of the present invention. The method includes coating a slurry including at least one of a halogen or a metal halide, and a lithium-ion intercalation material onto a cathode current collector. The method further includes dissolving a lithium salt in a solvent to form an electrolyte. The method further includes stacking an anode, a separator, and the cathode current collector to form the solid phase hybrid cathode lithium-ion battery. The solid phase hybrid cathode lithium-ion battery includes the anode, the electrolyte, the separator, and the cathode current collector coated with the slurry, where the at least one of the halogen or the metal halide of the slurry functions as an active cathode conversion material.

BRIEF DESCRIPTION OF THE SEVERAL VIEWS OF THE DRAWINGS

The drawings included in the present disclosure are incorporated into, and form part of, the specification. They illustrate embodiments of the present invention and, along with the description, serve to explain the principles of the present invention. The drawings are only illustrative of certain embodiments and do not limit the present invention.

DETAILED DESCRIPTION

Figure 1:
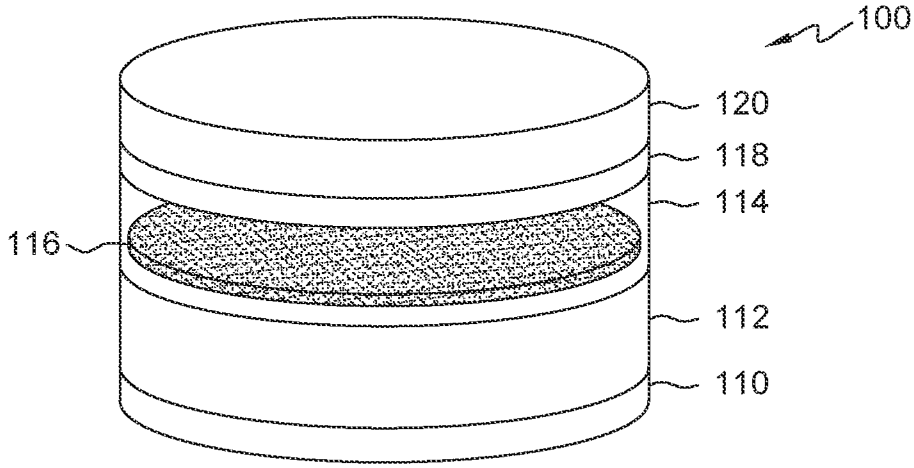
FIG. 1 is a conceptual diagram illustrating an example solid phase hybrid battery, generally designated 100, in accordance with at least one embodiment of the present invention.

The present invention relates generally to the field of energy storage devices, and more particularly, to energy storage devices having cathode(s) formed from multiple active materials, including at least one active material that utilizes a chemical conversion mechanism of energy storage, and at least one other active material that utilizes an ion-intercalation mechanism of energy storage.

Embodiments of the present invention provide for a method and resulting energy storage device thereof that increases the energy density and/or reduces the cost of rechargeable lithium battery cathodes by hybridizing a traditional lithium-ion intercalation cathode material with a halogen or metal-halide cathode conversion material to form an improved cathode. According to an embodiment of the present invention, an energy storage device having a hybrid cathode is provided, in which the energy density of a traditional metal ion intercalation cathode (e.g., lithium nickel manganese cobalt oxide (Li-NMC), lithium cobalt oxide (LCO), lithium iron phosphate (LFP)) is enhanced by the addition of a halogen or metal-halide conversion material (e.g., iodine ($I_2$) or lithium iodide (LiI)).

The motivation behind the creation of a hybrid cathode material formed from a lithium-ion intercalation material and a halogen or metal-halide conversion material is two-fold. First, embodiments of the present invention recognize that the cost of cathodes formed, in part, from cobalt and/or nickel, continues to increase and the market for these metals is often very volatile. Moreover, supply chain issues exist for cobalt and nickel due to increased environmental stability measures put in place for mining these metals. Embodiments of the present invention provide for a hybrid energy storage device with reduced costs and improved environmental impact by generating a hybridized cathode formed from a halogen or metal halide conversion material and a NMC or LCO based intercalation cathode. It should be appreciated that by replacing a portion of the cobalt and/or nickel used to form the cathode with a less costly and more environmentally sustainable halogen or metal halide conversion material, a hybrid energy storage device having an energy density that is similar to and/or exceeds the energy density of current lithium-ion batteries having cathodes formed purely from NMC or LCO may be achieved.

Second, embodiments of the present invention recognize that although lithium-ion batteries having cathodes formed purely from iron phosphate is already very cost beneficial, the energy density (theoretical specific capacity of ~170 mAh/g) is less than that of lithium-ion batteries having cathodes formed purely from NMC or LCO. This lower energy density significantly limits the range of applications that can use lithium-ion batteries having cathodes formed from iron phosphate. Embodiments of the present invention provide for increased energy density of lithium-ion batteries having cathodes formed from iron phosphate, while maintaining a relatively low manufacturing cost, by generating a hybridized cathode formed from a halogen or metal halide conversion material and LFP. It should be appreciated that by replacing a portion of the iron phosphate used to form the cathode with a halogen or metal halide conversion material, a cheaper and more environmentally sustainable hybrid energy storage device with an increased energy density is achieved.

According to one embodiment of the present invention, a solid phase hybrid cathode lithium-ion battery is formed from an intercalation material and a halogen or metal halide based conversion material, in which both the intercalation material and the halogen or metal halide based conversion material are prepared as slurry, and the slurry is coated onto a current collector. According to another embodiment of the present invention, a "dissolved phase" or "liquid phase" hybrid cathode lithium-ion battery is formed from an intercalation material and a halogen or metal halide based cathode conversion material, in which only the intercalation material is prepared as a slurry and coated onto a current collector, and the halogen or metal halide based cathode conversion material is solubilized into an electrolyte with one or more additional ionic salts. Here, the halogen or metal halide based cathode conversion material serves a dual role as both the electrolyte (to promote lithium ion transport) and the active cathode conversion material.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a conceptual diagram illustrating an example solid phase hybrid cathode battery (hereinafter referred to and generally designated as battery 100), in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Battery 100 includes an anode current collector 110, an anode 112, an electrolyte 114, a separator 116, a cathode 118, and a cathode current collector 120. Battery 100 operates via reduction-oxidation (redox) reactions. For example, battery 100 utilizes different oxidation states and redox reactions of one or more components or elements to charge and discharge battery 100.

Anode current collector 110 may include a material of suitable electrical conductivity that collects electrons generated by a redox reaction during discharge of battery 100 and provides a conductive path to an external circuit to which battery 100 is connected. Similarly, during recharge of battery 100, anode current collector 110 provides an electrical pathway between an external voltage source and anode 112 to supply voltage for another redox reaction to charge battery 100. Anode current collector 110 may be formed from any materials that achieve stability or passivation at the respective electrochemical potential of anode 112. In an embodiment, anode current collector 110 may include woven or non-woven metal fibers, metal foam, metal foil, or woven or non-woven carbon fibers. In an embodiment, anode current collector 110 may additionally, or alternatively, include stainless-steel mesh, copper (Cu) mesh, nickel (Ni) foam, and/or carbon paper. For example, anode current collector 110 may include a stainless-steel mesh with carbon nanoparticles deposited thereon. In another example, anode current collector 110 may be a porous material that is electrically conductive.

Anode 112 takes up metal ions from electrolyte 114 during charging and releases the metal ions to electrolyte 114 during discharging. Anode 112 may be any anode. For example, anode 112 may be formed from, but not limited to, lithium, magnesium, sodium, or any possible combinations thereof. In some embodiments, anode 112 consists essentially of elemental lithium, magnesium or sodium, or lithium, magnesium or sodium alloyed with one or more additional elements. In an embodiment, anode 112 is a lithium metal.

Electrolyte 114 includes at least one solvent and at least one lithium containing compound. In some embodiments, the at least one solvent of electrolyte 114 can be selected from the group consisting of, but not limited to, carbonate compounds, heterocyclic compounds, ethers, esters, cyclic ethers, cyclic esters, nitriles, and mixtures and combinations thereof. In some embodiments, the at least one solvent of electrolyte 114 can further be selected from, for example, non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dioxolane, dimethoxyethane (DME), and mixtures and combinations thereof. In an embodiment, electrolyte 114 includes equal parts of a solvent including 1,3 dioxolane and 1,2 dimethoxyethane. In an embodiment, the lithium containing compound is a lithium salt, such as lithium bis(trifluoromethanesulfonyl)imide or LiTFSI. In an embodiment, electrolyte 114 further includes at least one salt. For example, a salt may be provided by the lithium containing compound of electrolyte 114, such as LiTFSI.

In some embodiments, electrolyte 114 further includes one or more oxidizing gases. In an embodiment, electrolyte 114 may be in the presence of an oxidizing gas, and the phrase "includes an oxidizing gas" is intended to include such a configuration. In an embodiment, one or more oxidizing gases may be dissolved in the solvent including the at least one salt and the at least one lithium containing compound of electrolyte 114. In an embodiment, the oxidizing gas may include, but is not limited to, at least one of air, oxygen, nitric oxide, nitrogen dioxide, or mixtures and combinations thereof. The oxidizing gas helps induce the redox reactions of battery 100 as described above, and helps achieve highly reversible redox reactions, which may contribute to enhanced electrochemical performance of battery 100. It should be noted that although the oxidizing gas may help induce such redox reactions, the oxidizing gas is not consumed or evolved during use of battery 100 (i.e., the oxidizing gas does not participate in the redox reactions of battery 100).

Separator 116 provides an electronically insulating barrier between anode 112 and cathode 118 thereby forcing electrons through an external electrical circuit to which battery 100 is connected, such that the electrons do not travel through battery 100 (e.g., through electrolyte 114 of battery 100), while still enabling the metal ions to flow through battery 100 during charge and discharge. In various embodiments, separator 116 may be coated with electrolyte 114, soaked with electrolyte 114, located within electrolyte 114, or surrounded by/submerged within electrolyte 114. In an embodiment, separator 116 includes a non-conductive material to prevent movement of electrons through battery 100, such that the electrons move through the external circuit instead. For example, separator 116 may include glass, non-woven fibers, polymer films, or rubber.

Cathode 118 includes an active cathode conversion material (also interchangeably referred to herein as "cathode conversion material" or simply "conversion material") and a lithium-ion intercalation host (also interchangeably referred to herein as "cathode intercalation material" or simply "intercalation material"). In some embodiments, the active cathode conversion material is a molecular halogen. For example, the molecular halogen may be selected from, but not limited to $F_2$, $Cl_2$, $Br_2$, and $I_2$. In some embodiments, the active cathode conversion material is a metal halide (e.g., MX, where M is a metal element and X is a halogen element). In an embodiment, the metal halide may dissolve in a solvent, and dissociate into a respective metal ion and a respective halide ion. In an embodiment, the metal ion may be selected from, but not limited to, at least one of $Li^+$, $Al^{3+}$, $Mg^{2+}$, or $Na^+$ (e.g., M may be Li, Al, Mg, or Na), and the halide ion may include an ion selected from, but not limited to, at least one of $I^-$, $Br^-$, $Cl^-$, or $F^-$ (e.g., X may be I, Br, Cl, or F). In some embodiments, the active cathode conversion material is an organic halide compound (e.g., AX, where A is an organic species with a positive charge and X is a halogen element with a negative charge). In an embodiment, the organic halide compound may dissolve in a solvent, and dissociate into a respective organic cation and a respective halide anion. In an embodiment, the organic cation may be selected from, but not limited to, at least one of ammonium, alkylammonium, imidazolium, or pyrrolidinium, and the halide anion may include an ion selected from, but not limited to, at least one of $I^-$, $Br^-$, $Cl^-$, or $F^-$ (e.g., X may be I, Br, Cl, or F).

In an embodiment, the lithium-ion intercalation host is a metal oxide compound. For example, the lithium-ion intercalation host may be selected from, but not limited to, Lithium Cobalt Oxide (LCO) (e.g., $LiCoO_2$), Nickel Cobalt Aluminum (NCA) (e.g., $LiNi_xCo_yAl_zO_2$, $LiNi_{0.8}Co_{0.15}Al_{0.05}O_2$), Lithium Ion Manganese Oxide (LMO) (e.g., $LiMn_2O_4$) Lithium Nickel Manganese Cobalt Oxide (NMC) (e.g., $LiNiMnCoO_2$), Nickel Cobalt Manganese Oxide (NCM) (e.g., $LiNi_xCo_yMn_zO_2$, $LiNi0_{.33}Co_{0.33}Mn_{0.33}O_2$), Lithium Iron Phosphate (LFP, e.g., $LiFePO_4$), and mixtures and combinations thereof.

Cathode 118 is in electrochemical and/or physical contact with cathode current collector 120. In some embodiments, cathode 118 of battery 100 is in a viscous or slurry state. In other embodiments, cathode 118 of battery 100 is in a solid phase. In embodiments where cathode 118 remains in a solid phase, the density of cathode 118 need not necessarily be greater than the density of cathode current collector 120. In an embodiment, cathode 118 is initially formed in a viscous or slurry state, coated onto at least a bottom surface of cathode current collector 120, and cured to form a final, solid cathode.

Cathode current collector 120 may include a material of suitable electrical conductivity that collects electrons generated by a redox reaction during discharge of battery 100 and provides a conductive path to an external circuit to which battery is connected. Similarly, during recharge of battery 100, cathode current collector 120 provides an electrical pathway between an external voltage source and cathode 118 to supply voltage for another redox reaction to charge battery 100. Cathode current collector 120 may be formed from any materials that achieve stability or passivation at the respective electrochemical potential of cathode 118. In an embodiment, cathode current collector 120 may include woven or non-woven metal fibers, metal foam, metal foil, or woven or non-woven carbon fibers. In an embodiment, cathode current collector 120 may additionally, or alternatively, include stainless-steel mesh, aluminum (Al) mesh, nickel (Ni) foam, and/or carbon paper. For example, cathode current collector 120 may include a stainless-steel mesh with aluminum nanoparticles deposited thereon. In another example, cathode current collector 120 may be a porous material that is electrically conductive.

In some embodiments, battery 100 has a closed volume. For example, anode current collector 110, anode 112, electrolyte 114, separator 116, cathode 118, and cathode current collector 120 are within a closed cell or other enclosure. In this way, one or more oxidizing additives within battery 100 remain confined within battery 100. In other embodiments, battery 100 has a substantially closed volume. For example, anode current collector 110, anode 112, electrolyte 114, separator 116, cathode 118, and cathode current collector 120 are within a substantially enclosed cell or other enclosure. In this way, one or more oxidizing additives within battery 100 can be added to and/or removed from battery 100.

Figure 2:
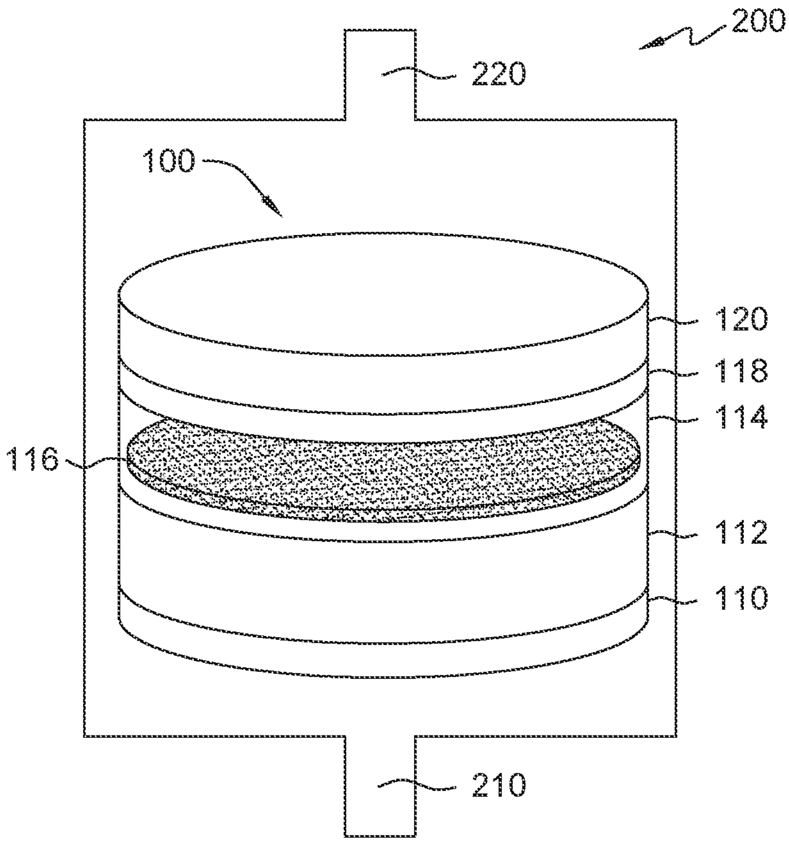
FIG. 2 is a conceptual diagram illustrating the example solid phase hybrid battery 100 of FIG. 1 within an enclosed cell system, generally designated 200, in accordance with at least one embodiment of the present invention.

FIG. 2 is a conceptual diagram illustrating battery 100 of FIG. 1 within an enclosed cell system 200. FIG. 2 provides an illustration of only one implementation and does not imply any limitations with regard to the environments in which different embodiments may be implemented. Many modifications to the depicted environment may be made by those skilled in the art without departing from the scope of the present invention as recited by the claims.

Enclosed cell system 200 may include a cell that houses battery 100 during operation of battery 100, a cell used to fabricate battery 100, or both. For example, enclosed cell system 200 may include a cell available from Swagelok of Solon, Ohio, under the trade designation SWAGELOK, and may be used to fabricate battery 100. In an embodiment, enclosed cell system 200 may include an inlet tube 210 and/or an outlet tube 220. Inlet tube 210 and outlet tube 220 may be used to introduce and remove oxidizing additives, including, but not limited to, air, oxygen, nitric oxide, nitrogen dioxide, and mixtures and combination thereof, into and out of enclosed cell system 200.

Figure 3:
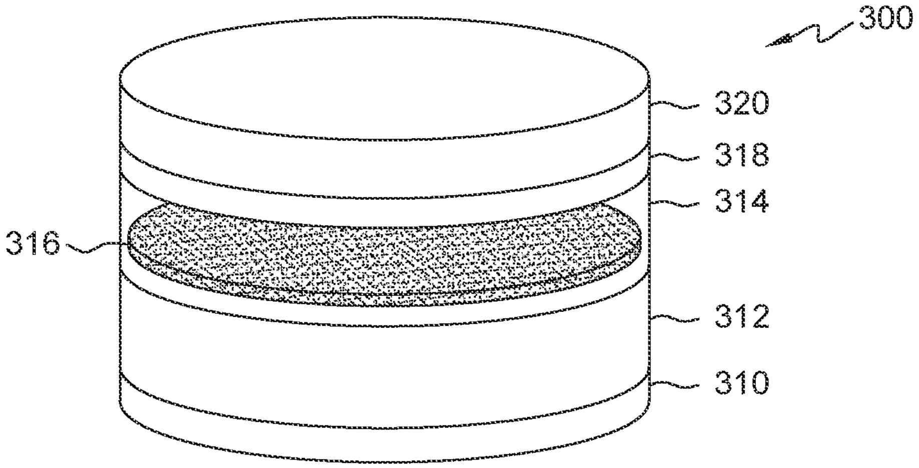
FIG. 3 is a conceptual diagram illustrating an example dissolved phase hybrid battery, generally designated 300, in accordance with at least one embodiment of the present invention.

FIG. 3 is a conceptual diagram illustrating an example dissolved phase hybrid cathode battery (hereinafter referred to as battery and generally designated as 300), in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the present invention as recited by the claims.

Battery 300 includes an anode current collector 310, an anode 312, an electrolyte 314, a separator 316, a cathode 318, and a cathode current collector 320. Battery 300 operates via reduction-oxidation (redox) reactions. For example, battery 300 utilizes different oxidation states and redox reactions of one or more components or elements to charge and discharge battery 300.

Anode current collector 310 may include a material of suitable electrical conductivity that collects electrons generated by a redox reaction during discharge of battery 300 and provides a conductive path to an external circuit to which batter is connected. Similarly, during recharge of battery 300, anode current collector 310 provides an electrical pathway between an external voltage source and electrolyte 314 to supply voltage for another redox reaction to charge battery 300. Anode current collector 310 may be formed from any materials that achieve stability or passivation at the respective electrochemical potential of anode 312. In an embodiment, anode current collector 310 may include woven or non-woven metal fibers, metal foam, metal foil, or woven or non-woven carbon fibers. In an embodiment, anode current collector 310 may additionally, or alternatively, include stainless-steel mesh, copper (Cu) mesh, nickel (Ni) foam, and/or carbon paper. For example, anode current collector 310 may include a stainless-steel mesh with carbon nanoparticles deposited thereon. In another example, anode current collector 310 may be a porous material that is electrically conductive.

Anode 312 takes up metal ions from electrolyte 314 during charging and releases the metal ions to electrolyte 314 during discharging. Anode 312 may be any anode material. For example, anode 312 may be formed from, but not limited to, lithium, magnesium, sodium, or any possible combinations thereof. In some embodiments, anode 312 consists essentially of elemental lithium, magnesium or sodium, or lithium, magnesium or sodium alloyed with one or more additional elements. In an embodiment, anode 312 is a lithium metal.

Electrolyte 314 includes at least one solvent and at least one halogen-containing compound acting as an active cathode conversion material. In some embodiments, the at least one solvent of electrolyte 314 can be selected from the group consisting of, but not limited to, carbonate compounds, heterocyclic compounds, ethers, esters, cyclic ethers, cyclic esters, nitriles, and mixtures and combinations thereof. In some embodiments, the at last one solvent of electrolyte 314 can further be selected from, for example, non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dioxolane, dimethoxyethane (DME), and mixtures and combinations thereof. In an embodiment, electrolyte 314 includes equal parts of a solvent including 1,3 dioxolane and 1,2 dimethoxyethane. In an embodiment, the electrolyte 314 further includes a lithium salt, such as lithium bis(trifluoromethanesulfonyl)imide or LiTFSI.

The at least one halogen-containing compound of electrolyte 314 functions as an active cathode conversion material. For example, the halogen-containing compound of electrolyte 314 may receive, store, and release metal ions for halogen redox reactions during charging and discharging of battery 300. In this way, battery 300 may include a cathode that only has a cathode intercalation material, and not a dedicated cathode conversion material. It should be appreciated that by having an electrolyte that includes a halogen-containing compound acting as an active cathode conversion material, battery 300 may be cheaper to make, more lightweight, have a higher energy density, a higher power density, or combinations thereof. For example, the high power density of electrolyte 314 including the halogen-containing compound that functions as the active cathode conversion material may enable battery 300 to have a higher energy density, and to be charged significantly faster than other batteries that do not have an electrolyte that includes a halogen-containing compound that functions as the active cathode conversion material.

In some embodiments, the halogen-containing compound of electrolyte 314 acting as the active cathode conversion material is a molecular halogen. For example, the molecular halogen may be selected from, but is not limited to, $F_2$, $Cl_2$, $Br_2$, and $I_2$. In some embodiments, the halogen-containing compound of electrolyte 314 acting as the active cathode conversion material is a metal halide salt (e.g., MX, where M is a metal element and X is a halogen element). In an embodiment, the metal halide may dissolve in a solvent, and dissociate into a respective metal ion and a respective halide ion. In an embodiment, the metal ion may be selected from, but not limited to, at least one of $Li^+$, $Al^{3+}$, $Mg^{2+}$, or $Na^+$ (e.g., M may be Li, Al, Mg, or Na), and the halide ion may include an ion selected from, but not limited to, at least one of $I^-$, $Br^-$, $Cl^-$, or $F^-$ (e.g., X may be I, Br, Cl, or F). In other embodiments, the halogen-containing compound of electrolyte 314 acting as the active cathode conversion material is an organic halide salt (e.g., AX, where A is an organic species with a positive charge and X is a halogen element with a negative charge). In an embodiment, the organic halide salt may dissolve in a solvent, and dissociate into a respective organic cation and a respective halide anion. In an embodiment, the organic cation may be selected from, but not limited to, at least one of ammonium, alkylammonium, imidazolium, or pyrrolidinium, and the halide anion may include an ion selected from, but not limited to, at least one of $I^-$, $Br^-$, $Cl^-$, or $F^-$ (e.g., X may be I, Br, Cl, or F).

In some embodiments, electrolyte 314 further includes one or more oxidizing gases. In an embodiment, electrolyte 314 may be in the presence of an oxidizing gas, and the phrase "includes an oxidizing gas" is intended to include such a configuration. In an embodiment, one or more oxidizing gases may be dissolved in the solvent including the at least one salt and the at least one lithium containing compound of electrolyte 314. In an embodiment, the oxidizing gas may include, but is not limited to, at least one of air, oxygen, nitric oxide, nitrogen dioxide, or mixtures and combinations thereof. The oxidizing gas helps induce the redox reactions of battery 300 as described above, and helps achieve highly reversible redox reactions, which may contribute to enhanced electrochemical performance of battery 300. It should be noted that although the oxidizing gas may help induce such redox reactions, the oxidizing gas is not consumed or evolved during use of battery 300 (i.e., the oxidizing gas does not participate in the redox reactions of battery 300).

Separator 316 forces electrons through an external electrical circuit to which battery 300 is connected such that the electrons do not travel through battery 300 (e.g., through electrolyte 314 of battery 300), while still enabling the metal ions to flow through battery 300 during charge and discharge. In various embodiments, separator 316 may be coated with electrolyte 314, soaked with electrolyte 314, located within electrolyte 314, or surrounded by/submerged within electrolyte 314. In an embodiment, separator 316 includes a non-conductive material to prevent movement of electrons through battery 300 such that the electrons move through the external circuit instead. For example, separator 316 may include glass, non-woven fibers, polymer films, or rubber.

Cathode 318 includes a lithium-ion intercalation host. In an embodiment, the lithium-ion intercalation host is a metal oxide or metal phosphate compound. For example, the lithium-ion intercalation host of cathode 318 may be selected from, but not limited to, Lithium Cobalt Oxide (LCO) (e.g., $LiCoO_2$), Nickel Cobalt Aluminum (NCA) (e.g., $LiNi_xCo_yAl_zO_2$, $LiNi_{0.8}Co_{0.15}Al_{0.05}O_2$), Lithium Ion Manganese Oxide (LMO) (e.g., $LiMn_2O_4$) Lithium Nickel Manganese Cobalt Oxide (NMC) (e.g., $LiNiMnCoO_2$), Nickel Cobalt Manganese Oxide (NCM) (e.g., $LiNi_xCo_yMn_zO_2$, $LiNi0_{.33}Co_{0.33}Mn_{0.33}O_2$), Lithium Iron Phosphate (LFP, e.g., $LiFePO_4$), and mixtures and combinations thereof.

In some embodiments, cathode 318 further includes, in addition to the lithium-ion intercalation host, a halogen-containing compound functioning as an active cathode conversion material. In some embodiments, a portion of the lithium-ion intercalation host (e.g., Nickel or Cobalt if the intercalation host is NMC or Cobalt if the intercalation host is LCO) of cathode 318 is replaced with the halogen-containing compound functioning as an active cathode conversion material. In other embodiments, a halogen-containing compound functioning as an active cathode material is added to cathode 318 without replacing a portion of the lithium-ion intercalation host of cathode 318.

In an embodiment, the halogen-containing compound of cathode 318 that functions as an active cathode conversion material is the same halogen-containing compound of electrolyte 314 that also functions as an active cathode conversion material. In an embodiment, the halogen-containing compound included in cathode 318 that functions as a cathode conversion material is a different halogen-containing compound included in electrolyte 314 that also functions as an active cathode conversion material. It should be appreciated that by including an active cathode conversion material in both electrolyte 314 and cathode 318, a hybrid energy storage device with an increased energy density is achieved.

In an embodiment, the lithium-ion intercalation host of cathode 318 is a metal oxide or metal phosphate compound. For example, the lithium-ion intercalation host of cathode 318 may be selected from, but not limited to, Lithium Cobalt Oxide (LCO) (e.g., $LiCoO_2$), Nickel Cobalt Aluminum (NCA) (e.g., $LiNi_xCo_yAl_zO_2$, $LiNi_{0.8}Co_{0.15}Al_{0.05}O_2$), Lithium Ion Manganese Oxide (LMO) (e.g., $LiMn_2O_4$) Lithium Nickel Manganese Cobalt Oxide (NMC) (e.g., $LiNiMnCoO_2$), Nickel Cobalt Manganese Oxide (NCM) (e.g., $LiNi_xCo_yMn_zO_2$, $LiNi0_{.33}Co_{0.33}Mn_{0.33}O_2$), Lithium Iron Phosphate (LFP, e.g., $LiFePO_4$), and mixtures and combinations thereof.

Cathode 318 is in electrochemical and/or physical contact with cathode current collector 320. In some embodiments, cathode 318 of battery 300 is in a viscous or slurry state. In other embodiments, cathode 318 of battery 300 is in a solid phase. In embodiments where cathode 318 remains in a solid phase, the density of cathode need not necessarily be greater than the density of cathode current collector 320. In an embodiment, cathode 318 is initially formed in a viscous or slurry state, coated onto at least a bottom surface of cathode current collector 320, and cured to form a final, solid cathode.

Cathode current collector 320 may include a material of suitable electrical conductivity that collects electrons generated by a redox reaction during discharge of battery 300 and provides a conductive path to an external circuit to which batter is connected. Similarly, during recharge of battery 300, cathode current collector 320 provides an electrical pathway between an external voltage source and electrolyte 314 to supply voltage for another redox reaction to charge battery 300. Cathode current collector 320 may be formed from any materials that achieve stability or passivation at the respective electrochemical potential of cathode 318. In an embodiment, cathode current collector 320 may include woven or non-woven metal fibers, metal foam, metal foil, or woven or non-woven carbon fibers. In an embodiment, cathode current collector 320 may additionally, or alternatively, include stainless-steel mesh, aluminum (Al) mesh, nickel (Ni) foam, and/or carbon paper. For example, cathode current collector 320 may include a stainless-steel mesh with aluminum nanoparticles deposited thereon. In another example, cathode current collector 320 may be a porous material that is electrically conductive.

In some embodiments, battery 300 has a closed volume. For example, anode current collector 310, anode 312, electrolyte 314, separator 316, cathode 318, and cathode current collector 320 are within a closed cell or other enclosure. In this way, one or more oxidizing additives within battery 300 remain confined within battery 300. In other embodiments, battery 300 has substantially closed volume. For example, anode current collector 310, anode 312, electrolyte 314, separator 316, cathode 318, and cathode current collector 320 are within a substantially enclosed cell or other enclosure. In this way, one or more oxidizing additives within battery 300 can be added to and/or removed from battery 300.

Figure 4:
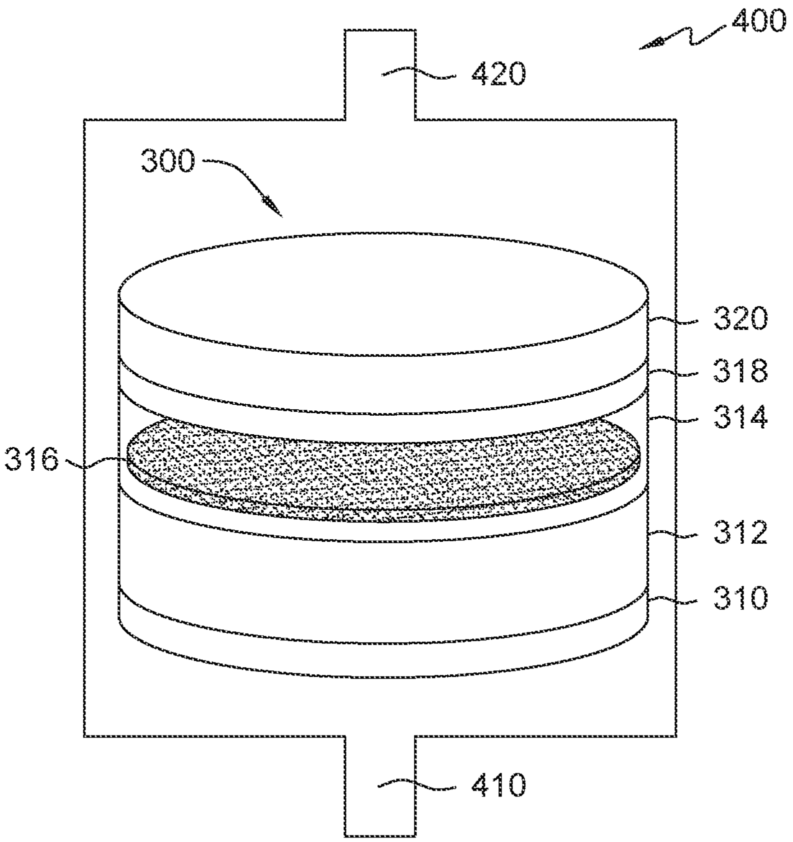
FIG. 4 is a conceptual diagram illustrating the example dissolved phase hybrid battery 300 of FIG. 3 within an enclosed cell system, generally designated 400, in accordance with at least one embodiment of the present invention.

FIG. 4 is a conceptual diagram illustrating battery 300 of FIG. 3 within an enclosed cell system 400. Enclosed cell system 400 may include a cell that houses battery 300 during operation of battery 300, a cell used to fabricate battery 300, or both. For example, enclosed cell system 400 may include a cell available from Swagelok of Solon, Ohio, under the trade designation SWAGELOK, and may be used to fabricate battery 300. In an embodiment, enclosed cell system 400 may include an inlet tube 410 and/or an outlet tube 420. Inlet tube 410 and outlet tube 420 may be used to introduce and remove oxidizing additives, including, but not limited to, air, oxygen, nitric oxide, nitrogen dioxide, and mixtures and combination thereof, into and out of enclosed cell system 400.

First Procedure

Preparation of a Secondary Energy Storage Device with a "Solid-Phase" Hybrid Cathode A cathode was prepared by first forming a slurry including a halogen cathode conversion material (e.g., $I_2$) or a metal halide cathode conversion material (e.g., LiI), a lithium based intercalation cathode material (e.g., LFP), a conductive additive, and a binder. The slurry was then coated onto a current collector and dried to produce the finished cathode.

An electrolyte was prepared by dissolving a lithium salt (e.g., LiTFSI) into one or more aprotic organic solvents (e.g., 1:1 mixture of 1,3-dioxolane/1,2-dimethoxythane) to achieve a desired electrolyte concentration.

Second Procedure

Preparation of a Secondary Energy Storage Device with a "Dissolved-Phase" Hybrid Cathode A cathode was prepared by forming a slurry including an intercalation cathode material (e.g., LFP), a conductive additive, and a binder. The slurry was then coated onto a current collector and dried to produce the finished cathode.

A cathode/electrolyte solution was prepared by dissolving a metal-halide salt (e.g., LiI) or halogen ($I_2$) into one or more aprotic organic solvents (e.g., 1:1 mixture of 1,3-dioxolane/1,2-dimethoxyethane) to achieve a desired cathode/electrolyte concentration.

Example 1

Formation of a Secondary Energy Storage Device with a "Solid-Phase" Hybrid Cathode A secondary energy storage device having a "solid-phase" hybrid cathode was formed by placing a wave spring within the negative side of a 2032 type coin battery. Then, a piece of lithium foil (anode) was mounted onto a 0.5 mm stainless steel spacer and placed on top of the wave spring. A small amount of the electrolyte prepared in accordance with the First Procedure was deposited onto the lithium metal anode, followed by a polymer separator (e.g., Celgard 2325) placed thereon. Then, another small amount of electrolyte prepared in accordance the First Procedure was deposited onto the polymer separator, followed by the hybrid cathode prepared in accordance with the First Procedure. Finally, the coin cell was sealed.

Example 2

Formation of a Secondary Energy Storage Device with a "Dissolved-Phase" Hybrid Cathode A secondary energy storage device having a "dissolved-phase" hybrid cathode was formed by placing a wave spring within the negative side of a 2032 type coin battery. Then, a piece of lithium foil (anode) was mounted onto a 0.5 mm stainless steel spacer and placed on top of the wave spring. A small amount of the cathode/electrolyte solution prepared in accordance with the Second Procedure was deposited onto the lithium metal anode, followed by a polymer separator (e.g., Celgard 2325) placed thereon. Then another small amount of the cathode/electrolyte solution prepared in accordance with the Second Procedure was deposited onto the polymer separator, followed by the hybrid cathode prepared in accordance with the Second Procedure. Finally, the cell was sealed.

Comparative Example 1

Areal Capacity of a Cell with a "Dissolved-Phase" Cathode Containing Only a Single Active Conversion Material (LiI)

Figure 5:
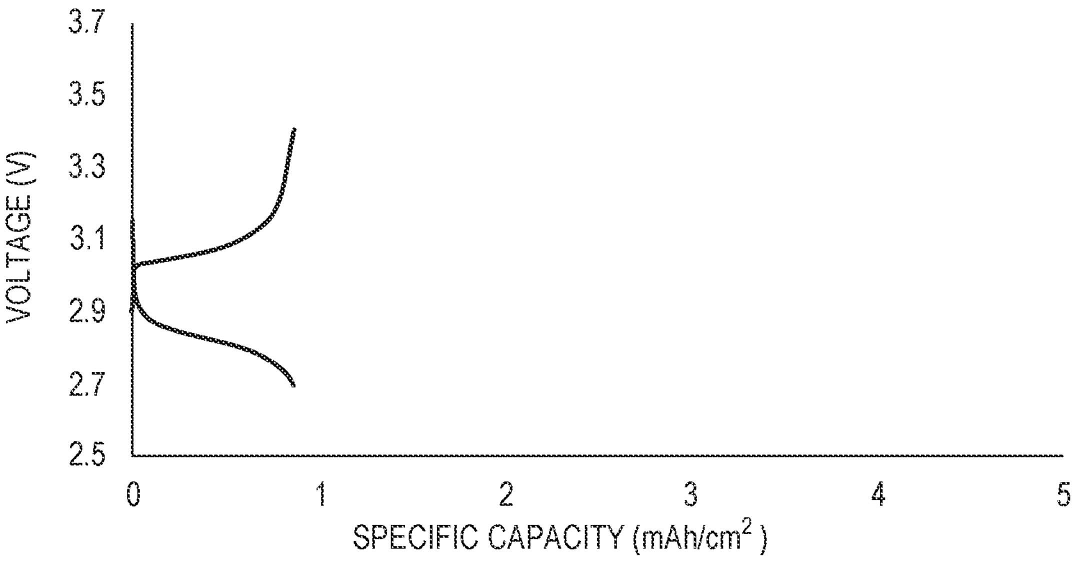
FIG. 5 is a plot of the areal capacity of a cell with a dissolved-state LiI cathode.

FIG. 5 is a plot of the areal capacity of a cell with a "dissolved-phase" LiI cathode. More specifically, FIG. 5 depicts the specific capacity normalized by the cathode area of a cell formed from a lithium metal anode, a porous carbon on a carbon cloth cathode, and 100 μL of an electrolyte comprising 0.4 mM $LiNO_3$, 1 mM of LiI per 500 μL of 1,3-dioxolane, and 500 μL of 1,2-dimethoxyethane.

Comparative Example 2

Areal Capacity of a Cell with a Cathode Containing Only a Single Active Intercalation Material ($LiFePO_4$)

Figure 6:
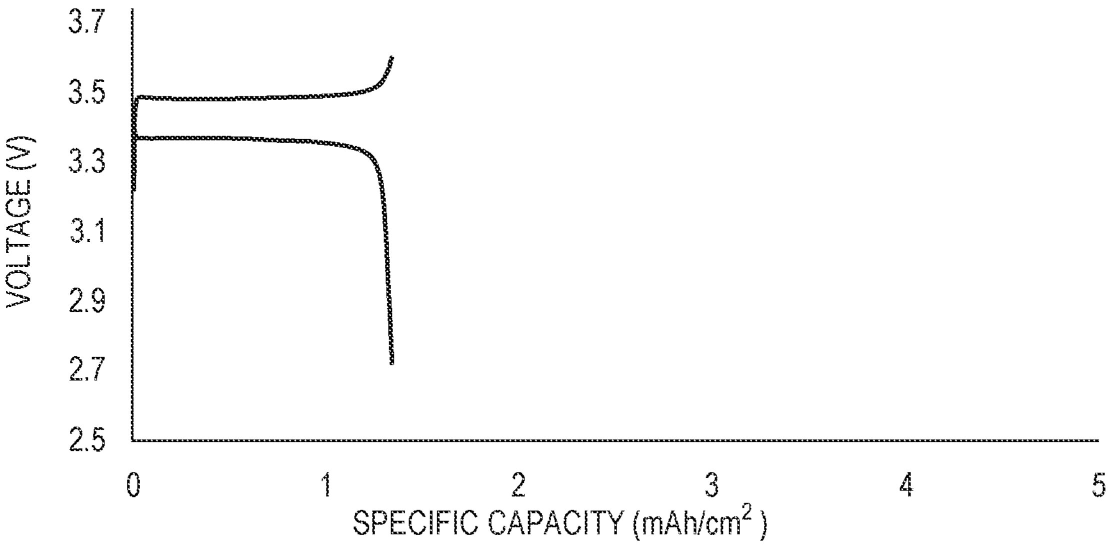
FIG. 6 is a plot of the areal capacity of a cell with a $LiFePO_4$ cathode.

FIG. 6 is a plot of the areal capacity of a cell with a $LiFePO_4$ cathode. More specifically, FIG. 6 depicts the specific capacity normalized by the cathode area of a cell formed from a lithium metal anode, a porous carbon and lithium iron phosphate on a carbon cloth cathode, and 100 μL of an electrolyte comprising 0.4 mM $LiNO_3$, 1 mM of $LiPF_6$ per 500 μL of 1,3-dioxolane, and 500 μL of 1,2-dimethoxyethane.

Working Example 1

Figure 7:
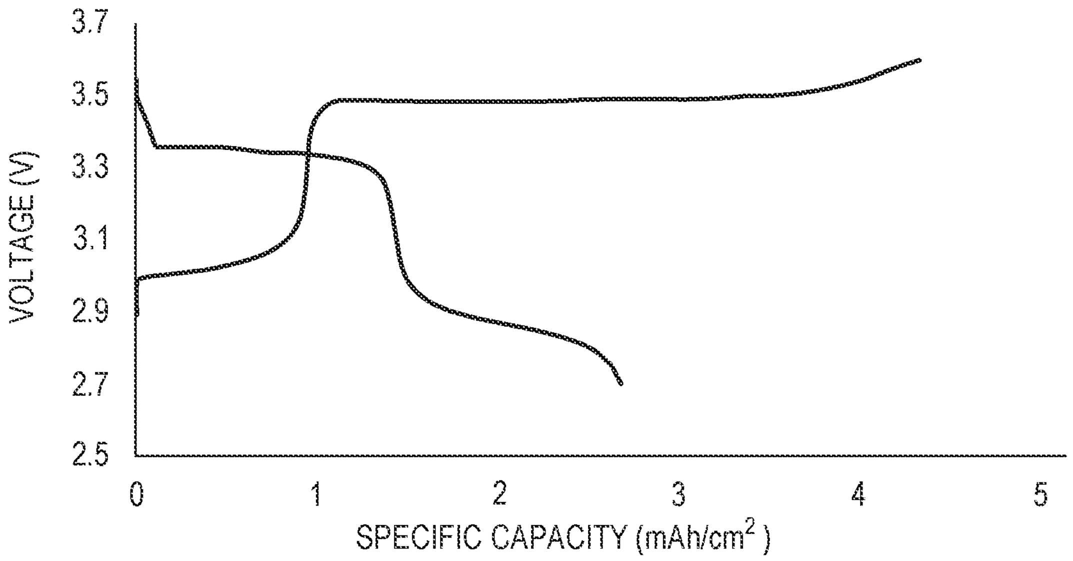
FIG. 7 is a plot of the areal capacity of a first cell with a hybrid dissolved-state LiI/solid phase $LiFePO_4$ cathode.

Areal Capacity of a First Cell with a Hybrid Dissolved Phase LiI/Solid Phase $LiFePO_4$ Cathode FIG. 7 is a plot of the areal capacity of a cell with a hybrid dissolved-state LiI/solid phase $LiFePO_4$ cathode. More specifically, FIG. 7 depicts the specific capacity normalized by the cathode area of a cell formed form a lithium metal anode, a porous carbon and lithium iron phosphate on a carbon cloth cathode, and 100 μL of an electrolyte comprising 0.4 mM $LiNO_3$, 1 mM of LiI per 500 μL of 1,3-dioxolane, and 500 μL of 1,2-dimethoxyethane.

Working Example 2

Figure 8:
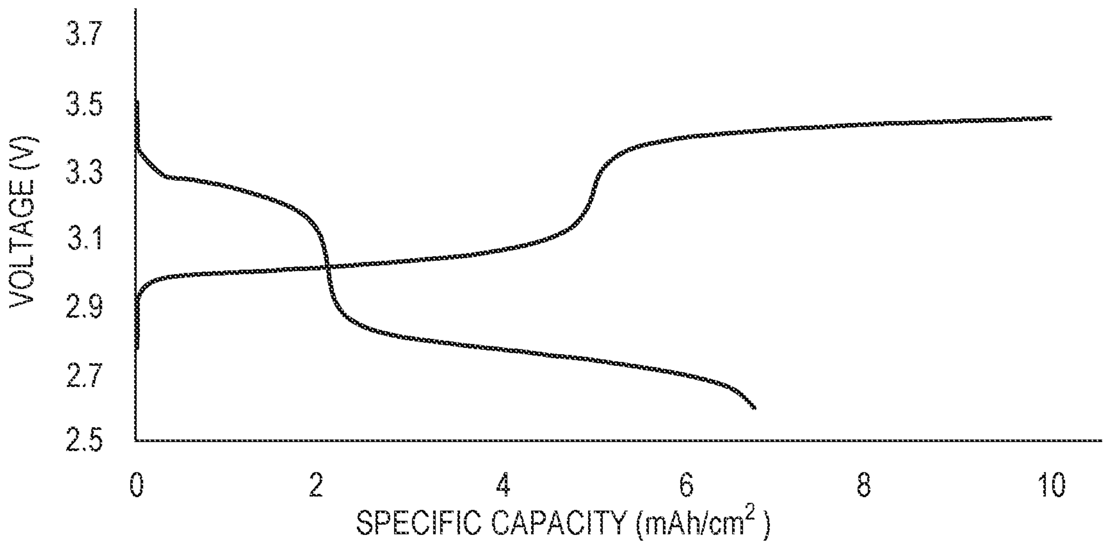
FIG. 8 is a plot of the areal capacity of a second cell with a hybrid dissolved-state LiI/solid phase $LiFePO_4$ cathode.

Areal Capacity of a Second Cell with a Hybrid Dissolved Phase LiI/Solid Phase $LiFePO_4$ Cathode FIG. 8 is a plot of the areal capacity of a cell with a hybrid dissolved-state LiI/solid phase $LiFePO_4$ Cathode. More specifically, FIG. 8 depicts the specific capacity normalized by the cathode area of a cell formed form a lithium metal anode, a porous carbon and lithium iron phosphate on a carbon cloth cathode, and 100 μL of an electrolyte comprising 0.4 mM $LiNO_3$, 5 mM of LiI per 500 μL of 1,3-dioxolane, and 500 μL of 1,2-dimethoxyethane.

Cycling Performance Example 1

Figure 9:
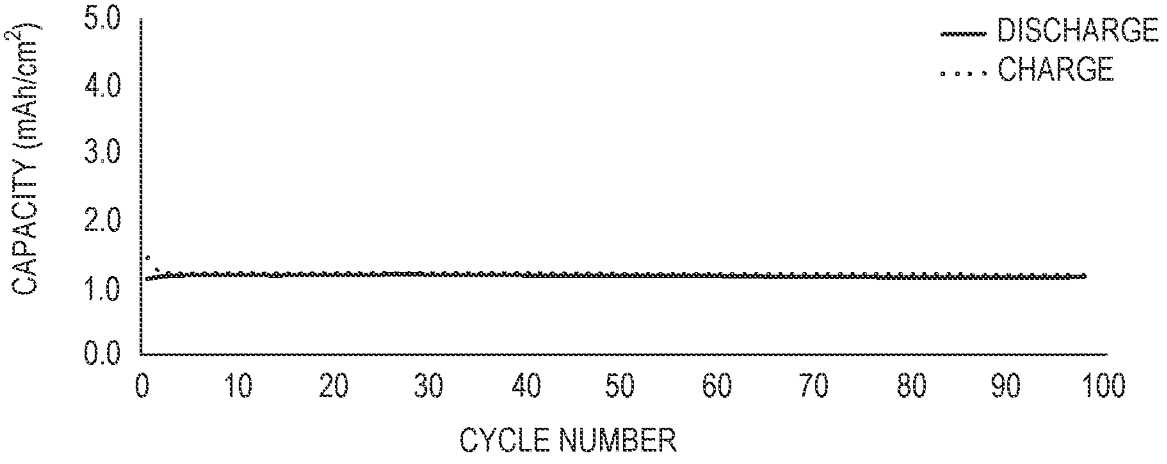
FIG. 9 is a plot of the cycling performance of a first cell formed from a hybrid dissolved phase LiI/solid phase $LiFePO_4$ cathode.

First Cell Formed from a Hybrid Dissolved Phase LiI/Solid Phase $LiFePO_4$ Cathode FIG. 9 illustrates the cycling performance of a cell formed from a hybrid dissolved phase LiI/solid phase $LiFePO_4$ cathode. More specifically, FIG. 9 depicts the cycling performance of a cell comprising a lithium metal anode, a porous carbon and lithium iron phosphate on a carbon cloth cathode, and 100 μL of an electrolyte comprising 0.4 mM $LiNO_3$, 1 mM of LiI per 500 μL of 1,3-dioxolane, and 500 μL of 1,2-dimethoxyethane. Galvanostatic cycling was performed within a voltage range of 2.7-3 V, such that the iodine electrochemistry, and not the LFP electrochemistry, contributed to the total capacity of the cell.

Cycling Performance Example 2

Figure 10:
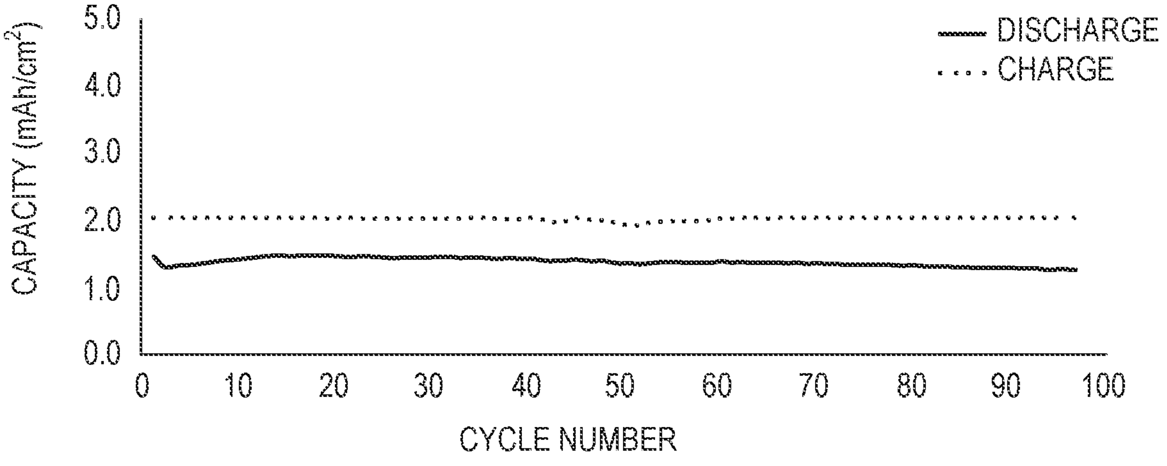
FIG. 10 is a plot of the cycling performance of a second cell formed from a hybrid dissolved phase LiI/solid phase $LiFePO_4$ cathode.

Second Cell Formed from a Hybrid Dissolved Phase LiI/Solid Phase $LiFePO_4$ Cathode FIG. 10 illustrates the cycling performance of a cell formed from a hybrid dissolved phase LiI/solid phase $LiFePO_4$ cathode. More specifically, FIG. 10 depicts the cycling performance of a cell comprising a lithium metal anode, a porous carbon and lithium iron phosphate on a carbon cloth cathode and 100 μL of electrolyte comprising 0.4 mM $LiNO_3$, 1 mM of LiI per 500 μL of 1,3-dioxolane, and 500 μL of 1,2-dimethoxyethane. Galvanostatic cycling was performed within a voltage range of 3-3.6 V, such that the LFP electrochemistry, and not the iodine electrochemistry, contributed to the total capacity of the cell.

Cycling Performance Example 3

Figure 11:
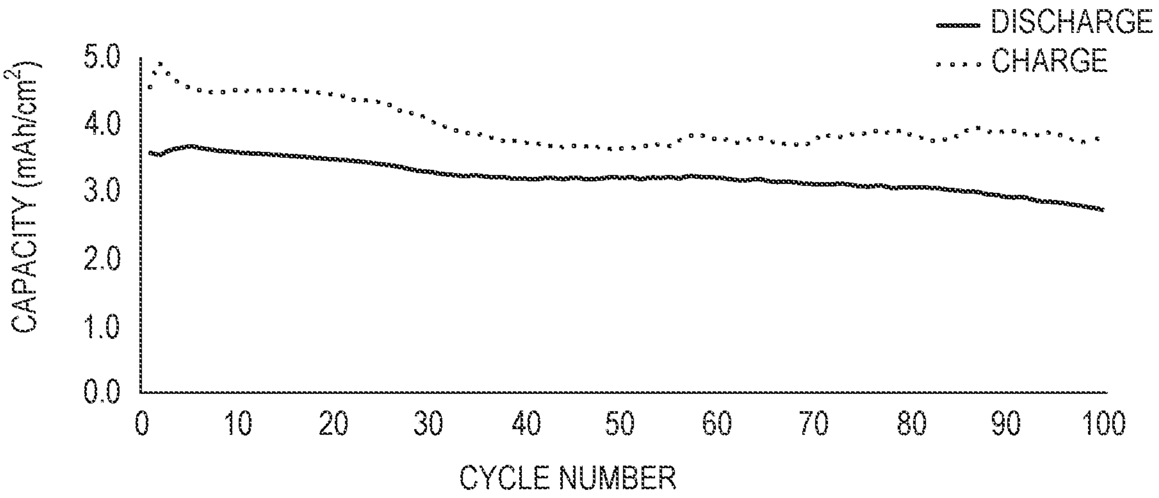
FIG. 11 is a plot of the cycling performance of a third cell formed from a hybrid dissolved phase LiI/solid phase $LiFePO_4$ cathode.

Third Cell Formed from a Hybrid Dissolved Phase LiI/Solid Phase $LiFePO_4$ Cathode FIG. 11 illustrates the cycling performance of a cell formed from a hybrid dissolved phase LiI/solid phase $LiFePO_4$ cathode. More specifically, FIG. 11 depicts the cycling performance of a cell comprising a lithium metal anode, a porous carbon and lithium iron phosphate on a carbon cloth cathode, and 100 μL of an electrolyte comprising 0.4 mM $LiNO_3$, 1 mM of LiI per 500 μL of 1,3-dioxolane, and 500 μL of 1,2-dimethoxyethane. Galvanostatic cycling was performed within a voltage range of 2.7-3.6 V, such that both the iodine and LFP electrochemistry contributed to the total capacity of the cell.

What is claimed is:

1. A rechargeable battery, comprising:
- an anode;
- a cathode current collector, the cathode current collector including an electrically conductive porous material;
- a cathode contacting the cathode current collector, wherein the cathode includes a lithium-ion intercalation host that utilizes a lithium-ion intercalation mechanism of energy storage; and
- an electrolyte, wherein the electrolyte includes a solvent and a first halogen-containing active cathode conversion material that utilizes a chemical conversion mechanism of energy storage, and further wherein the electrolyte is in contact with the anode and the cathode.

2. The rechargeable battery of claim 1, wherein the cathode further includes a second halogen-containing active cathode conversion material that utilizes the chemical conversion mechanism of energy storage.

3. The rechargeable battery of claim 2, wherein the first halogen-containing active cathode conversion material included in the electrolyte and the second halogen-containing active cathode conversion material included in the cathode are the same.

4. The rechargeable battery of claim 2, wherein the first halogen-containing active cathode conversion material included in the electrolyte and the second halogen-containing active cathode conversion material included in the cathode are different.

5. The rechargeable battery of claim 1, wherein the first halogen-containing active cathode conversion material included in the electrolyte is a metal halide.

6. The rechargeable battery of claim 5, wherein the metal halide dissociates into a respective halide ion and a respective metal ion in the solvent, and wherein the halide ion includes at least one of $I^-$, $Br^-$, $Cl^-$, or $F^-$, and the metal ion includes at least one of $Li^+$, $Al^{3+}$, $Mg^{2+}$, or $Na^+$.

7. The rechargeable battery of claim 1, wherein the lithium-ion intercalation host is selected from the group consisting of lithium cobalt oxide, nickel cobalt aluminum, lithium ion manganese oxide, lithium nickel manganese cobalt oxide, nickel cobalt manganese oxide, lithium iron phosphate and mixtures and combinations thereof.

8. The rechargeable battery of claim 1, wherein the solvent of the electrolyte is selected from the group consisting of carbonate compounds, heterocyclic compounds, ethers, esters, cyclic ethers, cyclic esters, nitriles, and mixtures and combinations thereof.

9. The rechargeable battery of claim 1, further comprising one or more oxidizing gases selected from the group consisting of air, oxygen, nitric oxide, nitrogen dioxide, and mixtures and combinations thereof.

10. A rechargeable battery, comprising:
- an anode;
- a cathode current collector, the cathode current collector including an electrically conductive porous material;
- a cathode contacting the cathode current collector, wherein the cathode includes a lithium iron phosphate intercalation host that utilizes a lithium-ion intercalation mechanism of energy storage; and
- an electrolyte, wherein the electrolyte includes a solvent and a lithium iodide active conversion material that utilizes a chemical conversion mechanism of energy storage, and further wherein the electrolyte is in contact with the anode and the cathode.

11. The rechargeable battery of claim 10, wherein the lithium iodide conversion material includes a respective iodide ion and a respective lithium ion.

12. The rechargeable battery of claim 10, wherein the electrolyte further includes a lithium salt.

13. The rechargeable battery of claim 10, wherein the solvent of the electrolyte is selected from the group consisting of carbonate compounds, heterocyclic compounds, ethers, esters, cyclic ethers, cyclic esters, nitriles, and mixtures and combinations thereof.

14. The rechargeable battery of claim 10, further comprising one or more oxidizing gases selected from the group consisting of air, oxygen, nitric oxide, nitrogen dioxide, and mixtures and combinations thereof.

15. A method of forming a rechargeable battery, comprising:
- coating a slurry including a lithium containing intercalation material that utilizes a lithium-ion intercalation mechanism of energy storage onto a cathode current collector, the cathode current collector including an electrically conductive porous material;

dissolving at least one of a first metal halide or halogen active cathode conversion material that utilizes a chemical conversion mechanism of energy storage into a solvent to form an electrolyte; and stacking an anode, a separator, and the cathode current collector coated with the slurry to form the rechargeable battery, wherein the rechargeable battery includes:

the anode;

the electrolyte, wherein the electrolyte includes at least one of the first metal halide or halogen active cathode conversion material;

the separator; and the cathode current collector coated with the slurry.

16. The method of claim 15, wherein the slurry further includes a second halogen or metal halide active cathode conversion material, wherein the second halogen or metal halide active cathode conversion material also utilizes the chemical conversion mechanism of energy storage.

17. The method of claim 16, wherein the second halogen or metal halide active cathode conversion material included in the slurry is the same as the first halogen or metal halide active cathode conversion material included in the electrolyte.

18. The method of claim 16, wherein the second halogen or metal halide active cathode conversion material included in the slurry is different than the first halogen or metal halide active cathode conversion material included in the electrolyte.

19. The method of claim 15, further comprising replacing a portion of the lithium-ion containing intercalation material that utilizes the lithium-ion intercalation mechanism of energy storage with a second metal halide or halogen active cathode conversion material, wherein the second metal halide or halogen active cathode conversion material also utilizes the chemical conversion mechanism of energy storage.

20. The method of claim 19, wherein the second metal halide or halogen active cathode conversion material replacing the portion of the lithium-ion containing intercalation material is the same as the first halogen or metal halide active cathode conversion material included in the electrolyte.

21. The method of claim 19, wherein the second metal halide or halogen active cathode conversion material replacing the portion of the lithium-ion containing intercalation material is different than the first halogen or metal halide active cathode conversion material included in the electrolyte.

22. A method of forming a rechargeable battery, comprising:

coating a slurry including a lithium iron phosphate cathode intercalation material that utilizes a lithium-ion intercalation mechanism of energy storage onto a cathode current collector, the cathode current collector including an electrically conductive porous material;

dissolving a lithium iodide active cathode conversion material that utilizes a chemical conversion mechanism of energy storage in a solvent to form an electrolyte; and stacking an anode, a separator, and the cathode current collector coated with the slurry to form the rechargeable battery, wherein the rechargeable battery includes:

the anode;

the electrolyte;

the separator; and the cathode current collector coated with the slurry.

* * * * *